(12) United States Patent
Simhon et al.

(10) Patent No.: US 9,858,342 B2
(45) Date of Patent: Jan. 2, 2018

(54) METHOD AND SYSTEM FOR SEARCHING FOR APPLICATIONS RESPECTIVE OF A CONNECTIVITY MODE OF A USER DEVICE

(71) Applicant: Doat Media Ltd., Tel Aviv (IL)

(72) Inventors: Joey Joseph Simhon, Ramat-Gan (IL); Amihay Ben-David, London (GB); Ran Ben-Aharon, Tel-Aviv (IL)

(73) Assignee: Doat Media Ltd., Tel Aviv (IL)

( * ) Notice: Subject to any disclaimer, the term of this patent is extended or adjusted under 35 U.S.C. 154(b) by 294 days.

(21) Appl. No.: 14/512,687

(22) Filed: Oct. 13, 2014

(65) Prior Publication Data

US 2015/0032714 A1   Jan. 29, 2015

Related U.S. Application Data

(63) Continuation-in-part of application No. 13/712,563, filed on Dec. 12, 2012, now Pat. No. 9,141,702, and a continuation-in-part of application No. 13/156,999, filed on Jun. 9, 2011, now Pat. No. 9,323,844, and a (Continued)

(51) Int. Cl.
*G06F 17/30* (2006.01)
*H04M 1/725* (2006.01)

(52) U.S. Cl.
CPC .. *G06F 17/30864* (2013.01); *G06F 17/30716* (2013.01); *G06F 17/30867* (2013.01); *H04M 1/72522* (2013.01)

(58) Field of Classification Search
CPC ......... G06F 17/30864; G06F 17/30867; G06F 17/30716; H04M 1/72522
See application file for complete search history.

(56) References Cited

U.S. PATENT DOCUMENTS

| 5,911,043 A | 6/1999 | Duffy et al. |
| 5,924,090 A | 7/1999 | Krellenstein |
| 6,101,529 A | 8/2000 | Chrabaszcz |

(Continued)

FOREIGN PATENT DOCUMENTS

| EP | 2288113 A1 | 2/2011 |
| JP | 2009278342 | 11/2009 |

(Continued)

OTHER PUBLICATIONS

*Alice Corp* v. *CLS Bank International*, 573 US, 134 S. Ct. 2347 (2014).

(Continued)

*Primary Examiner* — Leslie Wong
(74) *Attorney, Agent, or Firm* — M&B IP Analysts, LLC (57) ABSTRACT

A method for searching for applications respective of a connectivity mode of a user device is provided. The method includes detecting a set of applications of a plurality of applications installed in the user device that can operate in an offline mode; receiving a search query entered by a user of the user device; determining a current connectivity mode of the user device, wherein the current connectivity mode is any one of an offline mode and an online mode; searching for at least one matching application from the set of applications, when the current connectivity mode of the user device is the offline mode; and displaying the at least one selected application on a display of the user device.

19 Claims, 4 Drawing Sheets

Related U.S. Application Data continuation-in-part of application No. 13/296,619, filed on Nov. 15, 2011.

(60) Provisional application No. 61/890,265, filed on Oct. 13, 2013, provisional application No. 61/653,562, filed on May 31, 2012, provisional application No. 61/468,095, filed on Mar. 28, 2011, provisional application No. 61/487,831, filed on May 19, 2011.

(56) References Cited

U.S. PATENT DOCUMENTS

| | | | |
|---|---|---|---|
| 6,484,162 B1 | 11/2002 | Edlund et al. | |
| 6,546,388 B1 | 4/2003 | Edlund et al. | |
| 6,564,213 B1 | 5/2003 | Ortega et al. | |
| 6,605,121 B1 | 8/2003 | Roderick | |
| 7,266,588 B2 | 9/2007 | Oku | |
| 7,302,272 B2 | 11/2007 | Ackley | |
| 7,359,893 B2 | 4/2008 | Sadri et al. | |
| 7,376,594 B2 | 5/2008 | Nigrin | |
| 7,461,061 B2 | 12/2008 | Aravamudan et al. | |
| 7,529,741 B2 | 5/2009 | Aravamudan et al. | |
| 7,533,084 B2 | 5/2009 | Holloway et al. | |
| 7,565,383 B2 | 7/2009 | Gebhart et al. | |
| 7,599,925 B2 | 10/2009 | Larson et al. | |
| 7,636,900 B2 | 12/2009 | Xia | |
| 7,707,142 B1* | 4/2010 | Ionescu | G06F 17/30861 707/999.003 |
| 7,721,192 B2 | 5/2010 | Milic-Frayling et al. | |
| 7,774,003 B1 | 8/2010 | Ortega et al. | |
| 7,783,419 B2 | 8/2010 | Taniguchi et al. | |
| 7,792,815 B2 | 9/2010 | Aravamudan et al. | |
| 7,797,298 B2 | 9/2010 | Sareen et al. | |
| 7,958,141 B2* | 6/2011 | Sundaresan | G06F 17/30306 707/769 |
| 7,966,321 B2 | 6/2011 | Wolosin et al. | |
| 7,974,976 B2 | 7/2011 | Yahia et al. | |
| 8,032,666 B2 | 10/2011 | Srinivansan et al. | |
| 8,073,860 B2 | 12/2011 | Venkataraman et al. | |
| 8,086,604 B2 | 12/2011 | Arrouye et al. | |
| 8,271,333 B1 | 9/2012 | Grigsby et al. | |
| 8,312,484 B1 | 11/2012 | McCarty et al. | |
| 8,571,538 B2 | 10/2013 | Sprigg et al. | |
| 8,572,129 B1 | 10/2013 | Lee et al. | |
| 8,606,725 B1 | 12/2013 | Agichtein et al. | |
| 8,700,804 B1* | 4/2014 | Meyers | H04L 67/1095 709/217 |
| 8,718,633 B2 | 5/2014 | Sprigg et al. | |
| 8,793,265 B2 | 7/2014 | Song et al. | |
| 8,799,273 B1 | 8/2014 | Chang et al. | |
| 8,825,597 B1 | 9/2014 | Houston et al. | |
| 8,843,853 B1 | 9/2014 | Smoak et al. | |
| 2003/0018778 A1 | 1/2003 | Martin et al. | |
| 2004/0186989 A1 | 9/2004 | Clapper | |
| 2004/0229601 A1 | 11/2004 | Zabawskyj et al. | |
| 2005/0060297 A1 | 3/2005 | Najork | |
| 2005/0071328 A1 | 3/2005 | Lawrence | |
| 2005/0076367 A1 | 4/2005 | Johnson et al. | |
| 2005/0102407 A1 | 5/2005 | Clapper | |
| 2005/0108406 A1 | 5/2005 | Lee et al. | |
| 2005/0149496 A1 | 7/2005 | Mukherjee et al. | |
| 2005/0232423 A1 | 10/2005 | Horvitz et al. | |
| 2005/0243019 A1* | 11/2005 | Fuller | G06F 9/542 345/1.3 |
| 2005/0283468 A1 | 12/2005 | Kamvar et al. | |
| 2006/0004675 A1* | 1/2006 | Bennett | G06Q 10/08 705/402 |
| 2006/0031529 A1* | 2/2006 | Keith, Jr. | H04L 67/1095 709/227 |
| 2006/0064411 A1 | 3/2006 | Gross et al. | |
| 2006/0129931 A1* | 6/2006 | Simons | G06F 9/4446 715/705 |
| 2006/0136403 A1 | 6/2006 | Koo | |
| 2006/0200761 A1 | 9/2006 | Judd et al. | |
| 2006/0206803 A1 | 9/2006 | Smith | |
| 2006/0224448 A1 | 10/2006 | Herf | |
| 2006/0224593 A1 | 10/2006 | Benton et al. | |
| 2006/0248062 A1 | 11/2006 | Libes et al. | |
| 2006/0265394 A1 | 11/2006 | Raman et al. | |
| 2006/0277167 A1 | 12/2006 | Gross et al. | |
| 2007/0011167 A1 | 1/2007 | Krishnaprasad et al. | |
| 2007/0055652 A1 | 3/2007 | Hood et al. | |
| 2007/0082707 A1 | 4/2007 | Flynt et al. | |
| 2007/0112739 A1 | 5/2007 | Burns et al. | |
| 2007/0174900 A1 | 7/2007 | Marueli et al. | |
| 2007/0195105 A1 | 8/2007 | Koberg | |
| 2007/0204039 A1 | 8/2007 | Inamdar | |
| 2007/0239724 A1 | 10/2007 | Ramer et al. | |
| 2007/0255831 A1 | 11/2007 | Hayashi et al. | |
| 2007/0300185 A1 | 12/2007 | Macbeth et al. | |
| 2008/0065685 A1 | 3/2008 | Frank | |
| 2008/0077883 A1 | 3/2008 | Kim et al. | |
| 2008/0104195 A1* | 5/2008 | Hawkins | G06F 17/30902 709/217 |
| 2008/0114759 A1 | 5/2008 | Yahia et al. | |
| 2008/0133605 A1 | 6/2008 | MacVarish | |
| 2008/0222140 A1 | 9/2008 | Lagad et al. | |
| 2008/0256443 A1 | 10/2008 | Li et al. | |
| 2008/0306913 A1 | 12/2008 | Newman et al. | |
| 2008/0306937 A1 | 12/2008 | Whilte et al. | |
| 2008/0307343 A1 | 12/2008 | Robert et al. | |
| 2009/0013285 A1 | 1/2009 | Blyth et al. | |
| 2009/0049052 A1 | 2/2009 | Sharma et al. | |
| 2009/0070318 A1 | 3/2009 | Song et al. | |
| 2009/0077034 A1 | 3/2009 | Kim et al. | |
| 2009/0077047 A1 | 3/2009 | Cooper et al. | |
| 2009/0094213 A1 | 4/2009 | Wang | |
| 2009/0125482 A1 | 5/2009 | Peregrine et al. | |
| 2009/0210403 A1 | 8/2009 | Reinshmidt et al. | |
| 2009/0234811 A1 | 9/2009 | Jamil et al. | |
| 2009/0234814 A1 | 9/2009 | Boerries et al. | |
| 2009/0239587 A1 | 9/2009 | Negron et al. | |
| 2009/0240680 A1 | 9/2009 | Tankovich et al. | |
| 2009/0265328 A1* | 10/2009 | Parekh | G06F 17/30864 |
| 2009/0277322 A1 | 11/2009 | Cai et al. | |
| 2009/0327261 A1 | 12/2009 | Hawkins | |
| 2010/0030753 A1 | 2/2010 | Nad et al. | |
| 2010/0042912 A1 | 2/2010 | Whitaker | |
| 2010/0082661 A1 | 4/2010 | Beaudreau | |
| 2010/0094854 A1 | 4/2010 | Rouhani-Kalleh | |
| 2010/0106706 A1 | 4/2010 | Rorex et al. | |
| 2010/0162183 A1 | 6/2010 | Crolley | |
| 2010/0184422 A1* | 7/2010 | Ahrens | H04M 1/72525 455/419 |
| 2010/0228715 A1 | 9/2010 | Lawrence | |
| 2010/0257552 A1 | 10/2010 | Sharan et al. | |
| 2010/0262597 A1 | 10/2010 | Han | |
| 2010/0268673 A1 | 10/2010 | Quadracci | |
| 2010/0274775 A1 | 10/2010 | Fontes et al. | |
| 2010/0299325 A1 | 11/2010 | Tzvi et al. | |
| 2010/0306191 A1 | 12/2010 | Lebeau et al. | |
| 2010/0312782 A1 | 12/2010 | Li et al. | |
| 2011/0029925 A1 | 2/2011 | Robert et al. | |
| 2011/0035699 A1 | 2/2011 | Robert et al. | |
| 2011/0041094 A1 | 2/2011 | Robert et al. | |
| 2011/0047145 A1 | 2/2011 | Ershov | |
| 2011/0047510 A1 | 2/2011 | Yoon | |
| 2011/0055759 A1 | 3/2011 | Robert et al. | |
| 2011/0058046 A1 | 3/2011 | Yoshida et al. | |
| 2011/0072492 A1 | 3/2011 | Mohler et al. | |
| 2011/0078767 A1 | 3/2011 | Cai et al. | |
| 2011/0093488 A1 | 4/2011 | Amacker et al. | |
| 2011/0131205 A1 | 6/2011 | Iyer et al. | |
| 2011/0225145 A1* | 9/2011 | Greene | G06F 17/30648 707/722 |
| 2011/0252329 A1 | 10/2011 | Broman | |
| 2011/0264656 A1 | 10/2011 | Dumais et al. | |
| 2011/0314419 A1 | 12/2011 | Dunn et al. | |
| 2012/0158685 A1* | 6/2012 | White | G06F 17/30867 707/706 |
| 2012/0198347 A1 | 8/2012 | Hirvonen et al. | |
| 2013/0132896 A1 | 5/2013 | Lee et al. | |
| 2013/0166525 A1 | 6/2013 | Naranjo et al. | |

(56) References Cited

U.S. PATENT DOCUMENTS

| | | | |
|---|---|---|---|
| 2013/0219319 A1 | 8/2013 | Park et al. | |
| 2013/0290319 A1* | 10/2013 | Glover | G06F 17/3053 707/723 |
| 2014/0025502 A1* | 1/2014 | Ramer | G06Q 30/0247 705/14.64 |
| 2014/0049651 A1* | 2/2014 | Voth | H04N 5/44 348/189 |
| 2014/0279013 A1* | 9/2014 | Chelly | G06Q 30/0269 705/14.58 |
| 2015/0032714 A1* | 1/2015 | Simhon | G06F 17/30867 707/706 |

FOREIGN PATENT DOCUMENTS

| | | |
|---|---|---|
| JP | 20090285550 A1 | 11/2009 |
| JP | 2011044147 | 3/2011 |
| KR | 20030069127 | 8/2003 |
| KR | 20070014595 | 2/2007 |
| KR | 20110009955 | 1/2011 |
| WO | 2007047464 | 4/2007 |
| WO | 2009117582 | 9/2009 |
| WO | 2010014954 | 2/2010 |
| WO | 2011016665 | 2/2011 |
| WO | 2012083540 A1 | 6/2012 |

OTHER PUBLICATIONS

Currie, Brenton, Apple adds search filters, previous purchases to iPad App Store, Neowin.net, Feb. 5, 2011, http://www.neowin.net/news/apple-adds-search-filters-previous-purchases-to-ipad-app-store.

International Search Authority: "Written Opinion of the International Searching Authority" (PCT Rule 43bis.1) including International Search Report for International Patent Application No. PCT/US2012/059548; dated Mar. 26, 2013.

International Search Authority: "Written Opinion of the International Searching Authority" (PCT Rule 43bis.1) including International Search Report for corresponding International Patent Application No. PCT/US2012/069250; dated Mar. 29, 2013.

International Searching Authority: International Search Report including "Written Opinion of the International Searching Authority" (PCT Rule 43bis.1) for the related International Patent Application No. PCT/US2011/039808; dated Feb. 9, 2012.

Nie et al., "Object-Level Ranking: Bringing Order to Web Objects", International World Wide Web Conference 2005; May 10-14, 2005; Chiba, Japan.

Qin et al., "Learning to Rank Relationship Objects and Its Application to Web Search", International World Wide Web Conference 2008 / Refereed Track: Search—Ranking & Retrieval Enhancement; Apr. 21-25, 2008; Beijing, China.

Foreign Office Action for JP2015-537680 dated Dec. 6, 2016 from the Japanese Patent Office.

Kurihara, et al., "How to Solve Beginner's Problem, Mac Fan Supports" Mac Fan, Mainichi Communications Cooperation, Dec. 1, 2009, vol. 17, 12th issue, p. 92.

Notice of the First Office Action for Chinese Patent Application No. 201280004300.6, State Intellectual Property Office of the P.R.C., dated Oct. 26, 2016.

Urihara, et al., "How to Solve Beginner's Problem, Mac Fan Supports" Mac Fan, Mainichi Communications Cooperation, Dec. 1, 2009, vol. 17, 12th issue, p. 92, Translated.

Chinese Foreign Action dated Mar. 13, 2017 from the State Intellectual Property of the P.R.C. for Chinese Patent Application: 201280004301.0, China.

"Categories App Helps Organize iPhone Apps on your iPhone's Home Screen," iPhoneHacks, url: http://www.iphonehacks.com/2008/10/categoriesapp.html, pp. 1-4, date of publication: Oct. 5, 2008.

"iOS 4.2 for iPad New Features: Folders," Purcell, url: http://notebooks.com/2010/11/22/ios-4-2-foripad-new-features-folders/, pp. 1-5, date of publication Nov. 22, 2010.

Foreign Office Action for Patent Application No. 201380000403.X dated Jun. 2, 2017 by the State Intellectual Property Office of the P.R.C.

Second Office Action for Chinese Patent Application No.: 201280004300.6 dated Aug. 23, 2017, SIPO.

* cited by examiner

METHOD AND SYSTEM FOR SEARCHING FOR APPLICATIONS RESPECTIVE OF A CONNECTIVITY MODE OF A USER DEVICE

CROSS-REFERENCE TO RELATED APPLICATIONS

This application claims the benefit of U.S. Provisional Application No. 61/890,265 filed on Oct. 13, 2013, the contents of which are hereby incorporated by reference. This application is a continuation in part (CIP) of:

a) U.S. patent application Ser. No. 13/712,563 filed on Dec. 12, 2012 which claims the benefit of U.S. Provisional Patent Application No. 61/653,562 filed on May 31, 2012;

b) U.S. patent application Ser. No. 13/156,999 filed on Jun. 9, 2011 which claims the benefit of U.S. Provisional Patent application No. 61/468,095 filed Mar. 28, 2011 and U.S. Provisional Application No. 61/487,831, filed May 19, 2011; and c) U.S. patent application Ser. No. 13/296,619 filed on Nov. 15, 2011. The contents of the above-referenced applications are incorporated herein by reference.

TECHNICAL FIELD

The invention generally relates to search engines for mobile or native applications.

BACKGROUND

The use of mobile devices and especially smart phones has significantly increased in recent years. Such mobile devices have become, in many cases, a primary replacement for other computing devices, allowing access by the mobile devices to data in a variety of application programs.

Application programs, also known as applications or Apps, are designed to help a user of a mobile device, (typically a smart phone or tablet computer) to perform specific tasks. Applications may be installed on a mobile device, or may be accessible and sometimes downloadable from a central repository, such as, for example, the App-Store® or Google Play®. In order to search through the applications in mobile devices, a native search engine is commonly used.

However, as so many applications are now available for download it has become significantly more difficult to search for applications that are installed on the mobile device. Furthermore, while searching for an application using the available native search engine, the search results are based on the query without considering the operation of the mobile device.

It would be therefore advantageous to provide a solution that overcomes the limitations of the prior art by providing search results to users based on their query and at least an additional parameter.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later. For convenience, the term some embodiments may be used herein to refer to a single embodiment or multiple embodiments of the disclosure.

The disclosure relates in various embodiments to a method for searching for applications respective of a connectivity mode of a user device. The method comprises detecting a set of applications of a plurality of applications installed in the user device that can operate in an offline mode; receiving a search query entered by a user of the user device; determining a current connectivity mode of the user device, wherein the current connectivity mode is any one of an offline mode and an online mode; searching for at least one matching application from the set of applications, when the current connectivity mode of the user device is the offline mode; and displaying the at least one selected application on a display of the user device.

The disclosure also relates in various embodiments to a user terminal. The user terminal comprises a display; a processor; and a memory, the memory containing instructions that, when executed by the processor, configure the user terminal to: detect a set of applications of a plurality of applications installed in the user device that can operate in an offline mode; receive a search query entered by a user of the user device; determine a current connectivity mode of the user device, wherein the current connectivity mode is any one of an offline mode and an online mode; search for at least one matching application from the set of applications, when the current connectivity mode of the user device is the offline mode; and display the at least one selected application on a display of the user device.

BRIEF DESCRIPTION OF THE DRAWINGS

The subject matter disclosed herein is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

The embodiments disclosed are only examples of the many possible advantageous uses and implementations of the innovative teachings presented herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

By way of example for the various disclosed embodiments, a user device is configured to identify which applications of a plurality of applications accessible by a user device can operate offline. An offline mode of operation is when a mobile device executing the application currently is not connected to a data network. Upon accepting a user search query for searching applications, it checks if a connection to a data network is available, and if not applications that match the search query and can operate offline are provided as the search results. The search results are displayed over a mobile device initiating the search.

Figure 1:
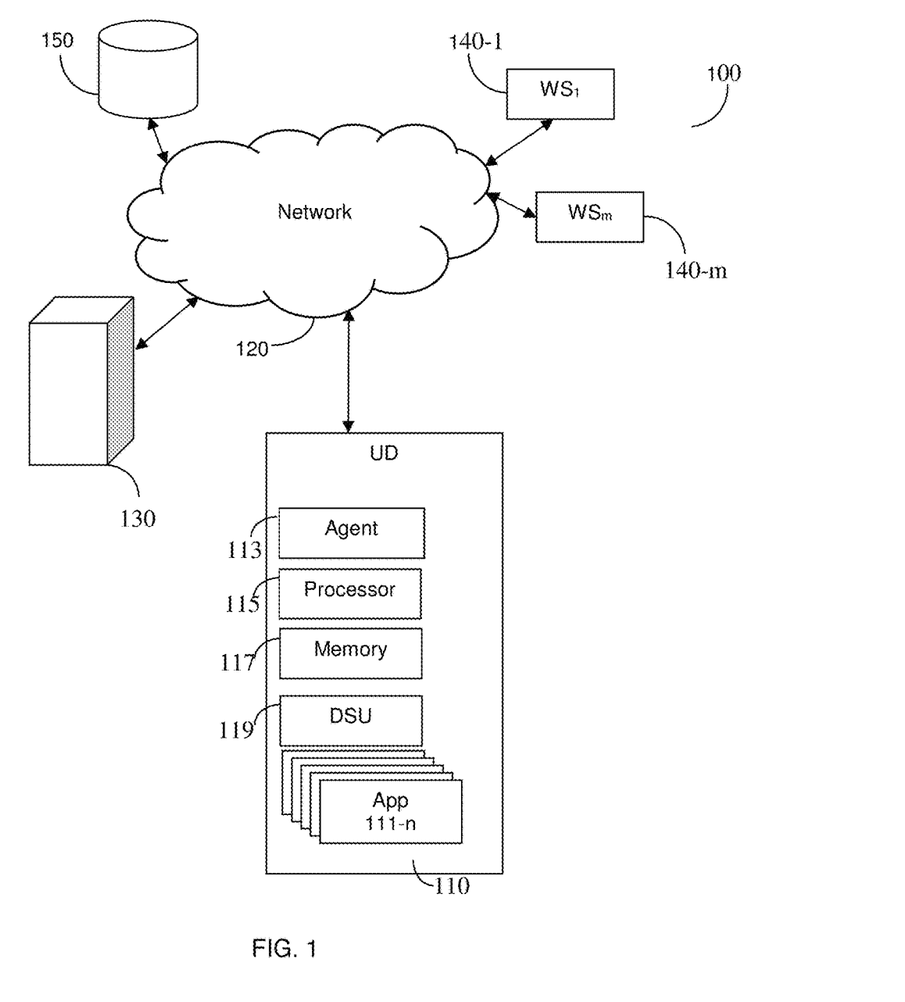
FIG. 1 is a schematic diagram of a network system utilized to describe the various embodiments disclosed herein.

FIG. 1 depicts an exemplary and non-limiting schematic diagram of a network system 100 utilized to describe the various embodiments disclosed herein. A user device 110 is connected to a network 120. The user device 110 may be, for example, a mobile phone, a smart phone, a tablet computer, a wearable computing device, and the like. In an embodiment, a user device 120 is configured to execute or otherwise enable the execution of a plurality of applications 111 (apps).

An application 111 discussed herein includes, but is not limited to, a native application (also known as "Internet mobile application"), a web application, and a virtual application. A native application is any software application that runs on a mobile device and can, but is not required to, be accessed by using the Internet or via a connection to the Internet. Typically, a native application is installed on smart phones or tablet computers (Apps for Apple's iPhone® and iPad®). Examples for native applications include applications that play movies, applications that download songs, applications through which a user can order a pizza, applications through which a user can request an electrician to make a house call, and the like. A native application is downloaded from a central repository, such an AppStore®, Google Play®, and the like. A virtual application is a software application which runs within a browser embedded in another program, thereby permitting users to utilize virtual versions of applications 111 without downloading such applications 111 directly. A web application is any application 111 that can be accessed on the World Wide Web (WWW) via a web browser. Typically, a web application is executed by a web server and the user's device 110 (client) receives the processing results, such as a web application for booking flight tickets. The user device 110 typically executes an operating system (OS), such as an iOS® and Android®.

The network 120 may be, but is not limited to, a local area network (LAN), a wide area network (WAN), a metro area network (MAN), the world wide web (WWW), the Internet, a wired network, a wireless network, a cellular network, and the like, as well as any combination thereof. The cellular network may be, but is not limited to, a code division multiple access (CDMA), a global system for mobile communications (GSM), a $3^{rd}$ generation mobile telecommunications technology (3G), a long term evolution (LTE) cellular network, and the like.

In an exemplary embodiment, the user device 110 includes an agent 113, a processor 115, a memory 117, and a data storage unit (DSU) 119. The memory 117 contains instructions that can be executed by the processor 115 for at least operating the agent 113. The agent 113 may be a program or a native installed in user device 110. In some embodiments, the agent 113 may be part of the operating system of the user device 110. In an embodiment, the agent 113 is configured to search and lunch applications for execution on the user device 110. Such applications may include native, virtual, and web applications as discussed above.

The searching capabilities of the agent 113 allow for searching applications 111 that are located in remote servers. Specifically, the agent 113 is configured to select one or more remote web resources 140 from multiple web resources 140-1 through 140-$m$ to respond to a query received from the user; send the query to the selected at least one web resource 140; and designate a unique display segment within a display area on the user device 110. Each such unique display segment corresponds to a selected web resource 140. The agent 113 is also configured to cause the selected at least one web resource 140 to respond to the input query within the corresponding unique display segment and establish a direct communication between the respective selected web resource 140 and the user device 110 for enabling, in response to the query, interaction of the selected web resource 140 with the user within the unique display segment corresponding to the selected web resource 140. The remote web resources 140 are communicatively connected to the network 120 and include at least web search engines, vertical comparison engines, servers of content providers, and servers of content publishers. The embodiments for the searching for remote resources are described in more detail in co-pending U.S. patent application Ser. No. 13/156,999 filed on Jun. 9, 2011, assigned to common assignee, and incorporated herein by reference.

The user device 110 further comprises a plurality of applications 111-1 through 111-$n$ installed therein. Some of the applications 111 require an active connection to the network 120 in order to operate and some do not require such connection. For example, applications 111 that enable voice over internet protocol (VOIP), chat, instant messaging, and the like require an active connection to the Internet in order to operate. Other type of applications 111, for example, games, or utilities, such as flashlight, voice recorder, and the like do not require any active connection in order to fully operate. Another type of application 111 requires an active network connection in order to fully operate but can also partially operate without a network connection. An example for such applications 111 are navigational applications that are able to show maps and directions without a network connection but do require an active connection in order to provide navigational services in real-time.

According to disclosed embodiments, the agent 113 is configured to determine which of the applications 111 are programmed to operate also in an offline mode of the user device 110, that is, when the user device 110 does not have an active connection to the network 120. The determination of which application 111 can operate may be performed by an application 111 is installed on the user device 110 and/or when the agent 113 is first installed. In an exemplary embodiment, such determination can be performed when a user query is received at the agent 113.

In order to determine which application 111 can operate in an offline mode, the agent 113 is configured to analyze the metadata associated with the application 111. The metadata typically includes the application's name, application's identifier (ID), type of application, application's category, connectivity requirements, and so on. In an embodiment, the agent 113 is configured to query an external system about the connectivity requirements of the application 111 when such information is not available in the application's metadata. An example for the external system is an application index database and/or a server 130. A possible implementation of an application index database 130 can be found in co-pending U.S. patent application Ser. No. 14/278,223 filed on May 15, 2014, assigned to common assignee, and incorporated herein by reference.

Responsive of the analysis, the agent 113 is configured to save, in the DSU 119, a status file including a list of applications 111, identified by their IDs or names, and the connectivity mode of the application 111 (i.e., offline or online). In an embodiment, only applications 111 that can operate in an offline mode are saved in the file.

In one embodiment, upon receiving a user search query, the agent 113 is configured to check the current connectivity mode of the user device 110. This may be performed, for example, by querying the operation system of the user device 110 about the status of a Wi-Fi connection, a cellular connection, and/or if the device is an "Airplane mode." Inactive Wi-Fi and cellular connections or an active Airplane mode indicates that the user device 110 is offline.

Upon determination that the user device 110 is offline, a search for applications 111 that match the user query is performed against a subset of applications 111 that can operate in an offline mode as designated in the status file. When the user device 110 is online the search for matching applications 111 can be performed against all applications 111. Alternatively or collectively, when the user device 110 is online the search for application 111 matching the user query can be performed against a set of web resources 140 as discussed above.

In one embodiment, an application 111 that matches the user query is an application 111 that best serves the user intent. The user intent represents the type of content, the content, and/or actions that may be of interest to the user for a current time period. User intents may range from general intents (e.g., "games") to more narrow intents (e.g., "Angry Birds®", "Tactical Games®", "games involving animals", and so on). Queries may further include one or more tokenized portions, wherein each tokenized portion represents a meaningful entity. Entities are physical or conceptual items bearing known types and attributes such as, but not limited to, products, people, locations, groups, theories, facts, virtual spaces, and so on. Types may describe an entity and can be used in identifying user intent. As a non-limiting example, the entity "Madonna" may bear types including, but not limited to, singer, director, actor, and celebrity. The process for providing applications 111 matching to a query based on the user intent is described in greater detail with respect to FIG. 4.

As noted above, an external system such as the server 130, which is also communicatively connected to the network 120, can also be utilized to determine which applications 111 can operate offline. In an embodiment, the server 130 is configured to receive a query from the agent 113 to detect the connectivity requirements of one or more applications 111. The server 130 is configured to search through a plurality web resources 140-1 through 140-m to find metadata associated and/or information about the application(s) 111 designated in the query. For example, the server 130 can search for the description of an application 111 hosted in the AppStore®. Any related information and/or metadata detected through the search is analyzed to determine the application 111 connectivity requirements, and in particular if the application 111 can operate in an offline mode. According to another embodiment, the server 130 is configured to execute each application(s) 111 designated in the received query in order to determine its the connectivity requirements. The server 130 responds to the query with the determined connectivity requirements of each application 111 (or at least of the application 111 can operate in an offline mode).

The system 100 may further include a database 150 for storing information such as applications 111 connectivity requirements, prior user intents, prior queries received from a user, semantic and statistic data for enhancing the search experience, and so on.

Figure 2:
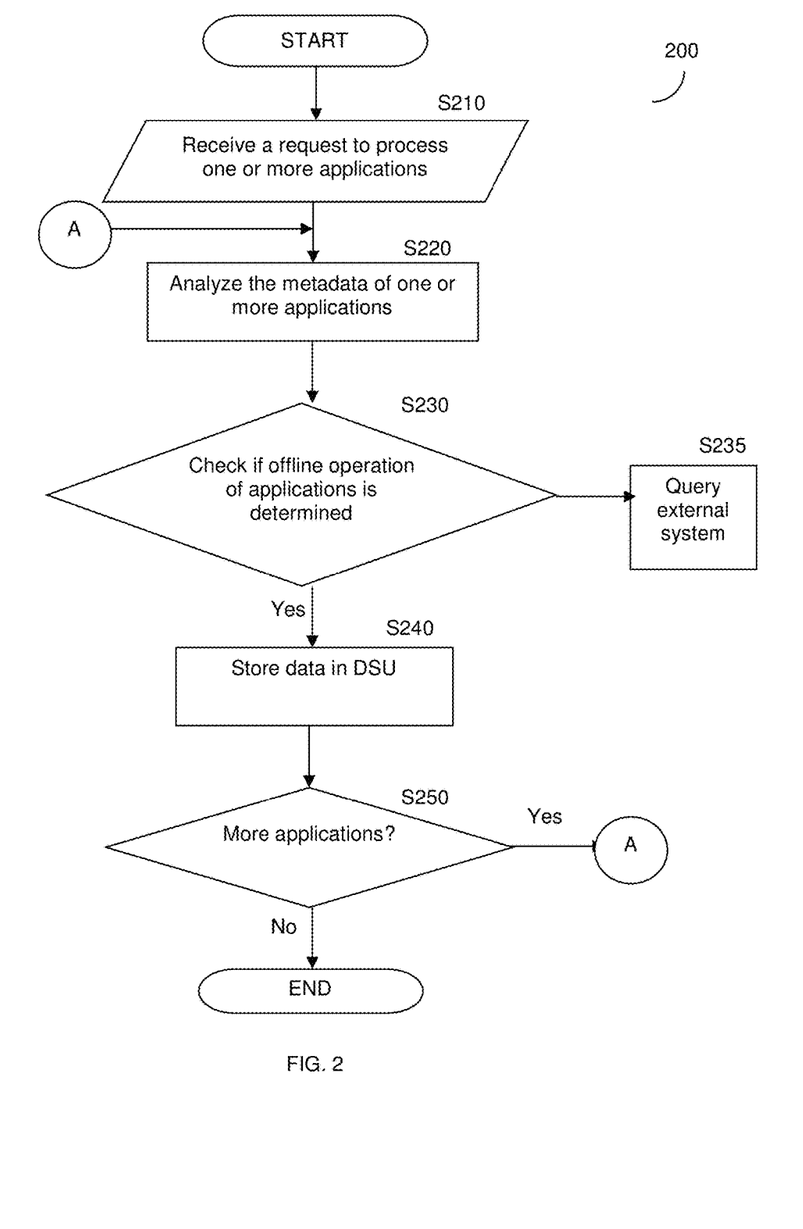
FIG. 2 is a flowchart describing a method for identifying which applications can operate offline according to an embodiment.

FIG. 2 depicts an embodiment of an exemplary and non-limiting flowchart 200 describing a method for identifying applications 111 that can operate in an offline mode of the user device 110 according to one embodiment.

In S210, a request to determine the connectivity requirements of one or more applications 111 installed locally on a user device (e.g., a user device 110-1) is received. In an embodiment, such a request can be triggered upon an installation of an application 111 in the user device 110, an installation of the agent 113, a download of an application 111 to the user device 110, an update of an application 111 already installed, and/or a query received from the user.

In S220, metadata of each application 111 designated in the request is analyzed to determine if the application 111 can operate in an offline mode. As noted above, the metadata of an application 111 typically includes one or more of the name, identifier, type of the downloaded application 111, and connectivity requirements of the application 111. If the metadata does not explicitly contain the connectivity requirements, such information can be derived based on the application's 111 type and/or category. For example, email, games, or utilities applications can operate in both offline and online modes; however, instant messaging, navigational, and VOIP applications can operate only in online mode.

In S230, it is checked if the connectivity requirements of each application 111 designed in the request is determined. If so, execution continues with S240; otherwise, at S235, an external system (i.e., external to the user device) is queried about the capabilities of the application 111. As noted above, such external system may be an application index database or the server 130. It should be noted that order of S220 and S235 is not limited to the way they are described herein. That is, S220 can be performed before S235 or S220 and S235 can be performed in parallel.

In S240, information related to the determined connectivity requirements of each application 111 is saved in a status file stored, for example, in the DSU 119 for further use. In an exemplary embodiment, the status file include a list of applications, identified by their IDs or names, and the connectivity mode of the application (i.e., offline or online). In a certain implementation only applications 111 that can operate in an offline mode are saved in the status file. In S250, it is checked whether there are additional requests to process and if so, execution continues with S210; otherwise, execution terminates.

Figure 3:
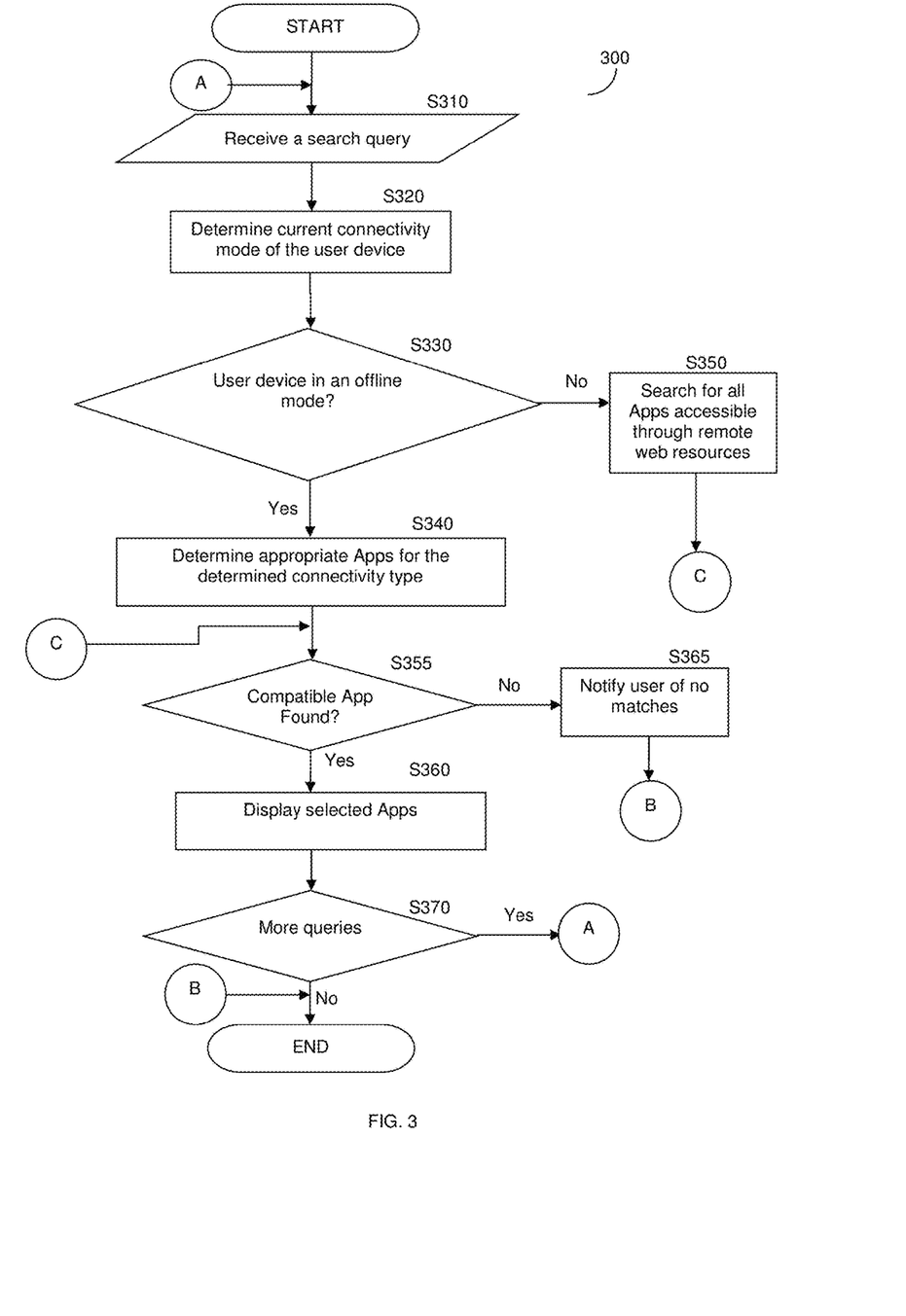
FIG. 3 is a flowchart describing a method for searching for applications respective of a connectivity mode of a user device according to one embodiment.

FIG. 3 depicts an exemplary and non-limiting flowchart 300 describing a method for searching for applications 111 respective of a connectivity mode of a user device 110 according to one embodiment.

In S310, a search query or a portion thereof, is received from a user of a user device 110, for example, the user device 110-1. The search query may be any one of a free text query, a voice query, and a structured query. In S320, the current connectivity mode of the user device 110 is determined. The connectivity to a data network can be achieved through a Wi-Fi and/or a cellular connection. Thus, in one embodiment, S320 includes querying the operation system of the device 110 about the status of a Wi-Fi connection, a cellular connection, and/or if the device is an "Airplane mode."

In S330, it is checked if the user device currently operates in an offline mode. Specifically, if the Wi-Fi and cellular connections are inactive or an Airplane is an active, the user device 110 is offline. If S330, results with a Yes answer execution continues with S340; otherwise, at S350 the query is utilized to search for matching applications among all applications installed in the user device 110 and/or applications 111 accessible through a remote web resources.

At S340, a search for applications 111 matching the search query among only applications 111 designated as configured to operate in an offline mode is performed. Such applications 111 are listed in the status file. It should be noted that all, none, or some of applications 111 designed in the status file may be considered as matching applications 111. However, an application 111 that cannot operate in an offline mode of the user device 110 would not be returned as part of the search result. In an embodiment, the search for matching applications 111 is performed based on the user intent as further described with respect to FIG. 4.

From either S340 or S350, at S355, a check is made whether at least one matching application 111 compatible to the current connectivity mode of the user device 110 is found, and if so, execution continues with S360; otherwise, execution continues with S365 where a notification is displayed on the display of the user device 110 that no appropriate applications 111 compatible of operating in the current connectivity mode found and execution terminates. In S360, the selected applications 111 are displayed on the display of the user device 110. In S370, it is checked whether there are additional search queries and if so, execution continues with S310; otherwise, execution terminates.

Figure 4:
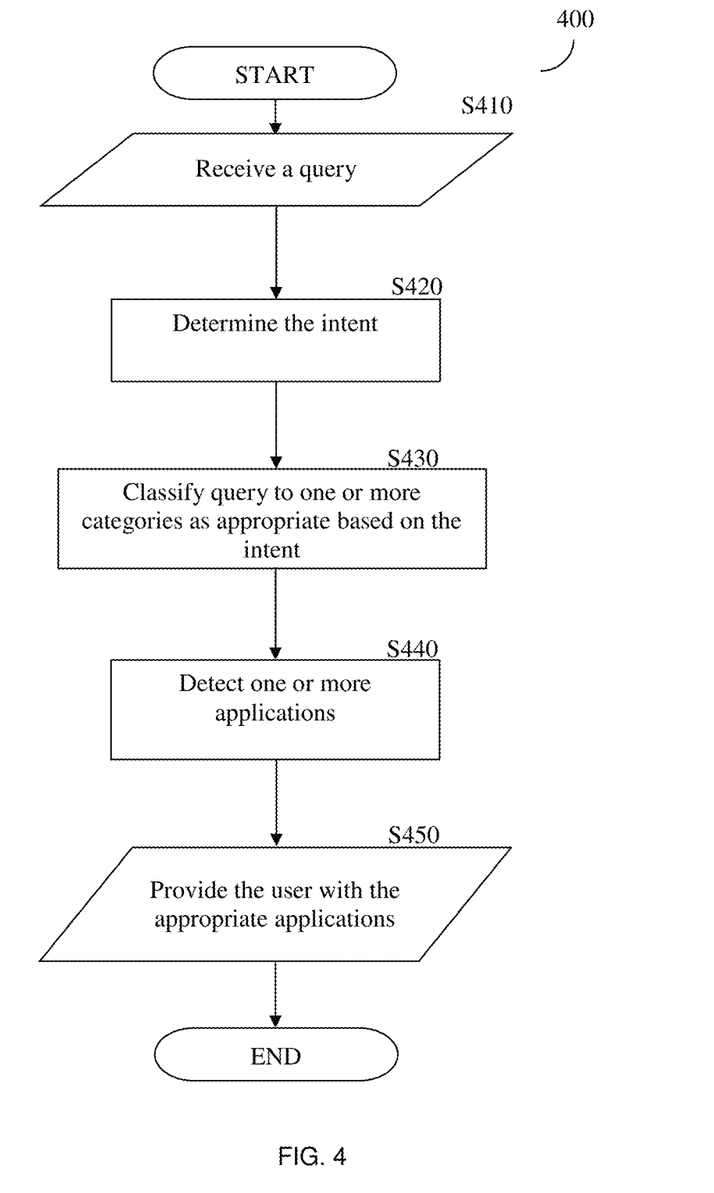
FIG. 4 is a flowchart describing a process for providing applications matching user queries based on the user intent.

FIG. 4 depicts an exemplary and non-limiting flowchart 400 of a method for providing matching applications 111 to queries based on user intent according to one embodiment. In S410, a query, or a portion thereof, is received from a user device (e.g., user device 110). In S420, the user intent is determined. The user intent represents the type of content, the content, and/or actions that may be of interest to the user for a current time period. Determination of user intent is further described in co-pending U.S. patent application Ser. No. 14/103,536 filed on May 12, 2013, assigned to the common assignee, which is hereby incorporated by reference for all that it contains.

In S430, based on the determined intent, the query is classified into one or more categories. In S440, the application index database is searched to detect one or more applications 111 that can appropriately serve the categories determined for the query. The application index database can be stored locally in the user device. In an embodiment, the search returned only applications 111 indexed with an appropriateness score above a predefined threshold. In another embodiment, applications 111 indexed to the same categories as to the input query are returned to the user.

In S450, the matching applications 111 are provided to the user device 110. The matching applications 111, i.e., search results may be displayed in a form of icons representing the matching applications 111 being rendered and displayed on the user device 110. A matching application 111 may be an application 111 that is installed and executed on the user device 110 and being configured to also operate in an offline mode of the user device 110.

It should be noted that the methods discussed with respect to FIGS. 2, 3 and 4 can be performed by an agent (e.g., agent 113) installed in a user device. The operation of the methods discussed with respect to FIGS. 2, 3 and 4 do not require an active connection of the user device 110 to a data network.

The various embodiments may be implemented as hardware, firmware, software, or any combination thereof. Moreover, the software is preferably implemented as an application program tangibly embodied on a program storage unit or tangible computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. All or some of the servers maybe combined into one or more integrated servers. Furthermore, a non-transitory computer readable medium is any computer readable medium except for a transitory propagating signal. The display segments and mini-display segments may be shown on a display area that can be a browser or another other appropriate graphical user interface of an internet mobile application, either generic or tailored for the purposes described in detail hereinabove.

All examples and conditional language recited herein are intended for pedagogical purposes to aid the reader in understanding the principles and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for searching for applications respective of a connectivity mode of a user device, comprising:
    detecting a set of applications of a plurality of applications installed in the user device that can operate in an offline mode;
    receiving a search query entered by a user of the user device;
    determining a current connectivity mode of the user device, wherein the current connectivity mode is any one of an offline mode and an online mode;
    searching for at least one matching application from the set of applications, when the current connectivity mode of the user device is the offline mode;
    wherein the at least one matching application is an application from the set of applications that best matches at least one user intent based on the search query; and
    displaying the at least one selected application on a display of the user device.

2. The method of claim 1, further comprising:
    searching for at least one matching application among the plurality of applications, when the current connectivity mode of the user device is the online mode.

3. The method of claim 2, further comprising:
    searching for at least one matching application among a plurality of remote web resources, when the current connectivity mode of the user device is the online mode.

4. The method of claim 1, wherein in the offline mode is when the user device is not connected to a data network, wherein the data network is at least one of: a wireless network and a cellular network.

5. The method of claim 4, wherein determining the current connectivity mode further comprises:
querying an operation system of the user device about a status of the connection to the cellular network and the wireless network.

6. The method of claim 1, wherein detecting the set of applications that can operate in an offline mode further comprises:
analyzing metadata associated with each of the plurality of applications.

7. The method of claim 1, further comprising:
generating a status file listing the subset of applications, identified by their identifiers and their respective connectivity mode; and
saving the status file in a storage of the user device.

8. The method of claim 1, wherein searching for the at least one matching application further comprises:
analyzing the search query;
determining the user intent respective of the analysis of the search query;
classifying the search query to at least one category respective of the determined user intent;
matching the at least one category of the search query to the at least one category of each indexed application; and
returning the at least one matching application to the user device.

9. The method of claim 8, wherein the search for the at least one matching application is performed when the current connectivity mode is offline.

10. A non-transitory computer readable medium having stored thereon instructions for causing a processing circuity to execute a process for searching for applications respective of a connectivity mode of a user device, the process comprising:
detecting a set of applications of a plurality of applications installed in the user device that can operate in an offline mode;
receiving a search query entered by a user of the user device;
determining a current connectivity mode of the user device, wherein the current connectivity mode is any one of an offline mode and an online mode;
searching for at least one matching application from the set of applications, when the current connectivity mode of the user device is the offline mode;
wherein the at least one matching application is an application from the set of applications that best matches at least one user intent based on the search query; and
displaying the at least one selected application on a display of the user device.

11. A user terminal, comprising:
a display;
a processing circuity; and
a memory, the memory containing instructions that, when executed by the processing circuity, configure the user terminal to:
detect a set of applications of a plurality of applications installed in the user device that can operate in an offline mode;
receive a search query entered by a user of the user device;
determine a current connectivity mode of the user device, wherein the current connectivity mode is any one of an offline mode and an online mode;
search for at least one matching application from the set of applications, when the current connectivity mode of the user device is the offline mode; and
display the at least one selected application on a display of the user device.

12. The user terminal of claim 11, is further configured to:
search for at least one matching application at least among the plurality of applications, when the current connectivity mode of the user device is the online mode.

13. The user terminal of claim 12, is further configured to:
search for at least one matching application among a plurality of remote web resources, when the current connectivity mode of the user device is the online mode.

14. The user terminal of claim 11, wherein in the offline mode is when the user device is not connected to a data network, wherein the data network is at least one of: a wireless network and a cellular network.

15. The user terminal of claim 14, is further configured to:
query an operation system of the user device about a status of the connection to the cellular network and the wireless network.

16. The user terminal of claim 11, is further configured to:
analyze metadata associated with each of the plurality of applications to determine if the application can operate in an offline mode.

17. The user terminal of claim 11, is further configured to:
generate a status file listing the subset of applications, identified by their identifiers and their respective connectivity mode; and
save the status file in the memory.

18. The user terminal of claim 11, is further configured to:
analyze the search query;
determine the user intent respective of the analysis of the search query;
classify the search query to at least one category respective of the determined user intent;
match the at least one category of the search query to the at least one category of each indexed application; and
return the at least one matching application to the user device.

19. The user terminal of claim 18, wherein the search for the at least one matching application is performed when the current connectivity mode is offline.

* * * * *